United States Patent [19]

Resch

[11] Patent Number: 4,802,712

[45] Date of Patent: Feb. 7, 1989

[54] ANTILOCK SYSTEM FOR A VEHICLE HAVING POWER-ASSISTED HYDRAULIC MULTIPLE-CIRCUIT BRAKE SYSTEM

[75] Inventor: Reinhard Resch, Stuttgart, Fed. Rep. of Germany

[73] Assignee: Daimler-Benz Aktiengesellschaft, Fed. Rep. of Germany

[21] Appl. No.: 847,225

[22] Filed: Apr. 2, 1986

Related U.S. Application Data

[63] Continuation-in-part of Ser. No. 686,477, Dec. 26, 1984, Pat. No. 4,629,258.

[30] Foreign Application Priority Data

Apr. 2, 1985 [DE] Fed. Rep. of Germany ....... 3511974

[51] Int. Cl.$^4$ ............................................... B60T 8/44
[52] U.S. Cl. ...................................... 303/114; 60/545
[58] Field of Search .................. 60/545, 551; 303/92, 303/103, 110, 113, 114, 115, 116

[56] References Cited

U.S. PATENT DOCUMENTS

| 4,629,258 | 12/1986 | Resch et al. | 303/92 |
| 4,641,894 | 2/1987 | Belart | 303/114 |

FOREIGN PATENT DOCUMENTS

| 2249352 | 4/1974 | Fed. Rep. of Germany . |
| 3347618 | 7/1985 | Fed. Rep. of Germany . |

Primary Examiner—Duane A. Reger

[57] ABSTRACT

A brake system with hydraulic power assistance having a control valve which connects a fluid pressure to a brake booster for normal braking and disables the brake booster and connects fluid pressure to a counterpiston which moves an output piston enlarging the output pressure space and thereby lowering the brake pressure during antilock control. The source of pressure may be a brake pedal proportional booster pressure derived from an auxiliary pressure source or may be the auxiliary pressure source itself.

18 Claims, 3 Drawing Sheets

ANTILOCK SYSTEM FOR A VEHICLE HAVING POWER-ASSISTED HYDRAULIC MULTIPLE-CIRCUIT BRAKE SYSTEM

CROSS REFERENCE TO A RELATED APPLICATION

This application is a CIP of U.S. Ser. No. 686,477, filed Dec. 26, 1984, for Hydraulic Daul Circuit Brake System for Road Vehicles by R. Resch and H. Krohn.

BACKGROUND AND SUMMARY

This invention relates to an antilock system for a vehicle having a power-assisted hydraulic multiple-circuit brake system, including a control cylinder that is developed as a tandem master cylinder and can be operated by a pedal. A primary output pressure space of said control cylinder, that is delimited by the primary piston and a secondary floating piston, is connected via a pressure modulator to a brake circuit that can be statically acted upon by pressure. The brake circuit is able to be subjected to an antilock control operatin according to the principle of volume expansion.

In the case of a known antilock system of this type, one pressure modulator is provided for each of the total of four wheel brakes of the vehicle. The output pressure of one or the other output pressure space of a tandem master cylinder, that is provided as a brake control device and can be pedal-operated via a hydraulic or pneumatic brake-power booster unit of conventional construction, can be coupled into the connected wheel brake via the pressure modulars. Each of these pressure modulators has a modulator piston with two flanges that, in a pressure sealed manner, can be slid in a housing. The two flanges being connected with one another by means of a piston rod that is guided through a central bore of a partition of the modulator housing so that it can be slid in a pressure-sealed way. The output pressure space of the respective modulator, to which the assigned wheel brake is connected, is delimited by the other piston and the partition. The input pressure space of the modulator, that is connected to one of the control output pressure spaces of the tandem master cylinder, is delimited by the other piston flange and this partition. By means of the admission of pressure to the input pressure space, the modulator piston is shifted in the sense of a reduction of the output pressure space, causing brake pressure to build up in the connected wheel brake.

Two each of these modulators are housed in a joint housing part in such a way that the flanges of their modulator pistons, that in each case on one side delimit the output pressure space, jointly delimit a counterpressure space in axial direction. By the admission of pressure to the counter pressure space, during a control phase of the antilock system, the modulator pistons shifts in the sense of an enlargement of the volumes of the output pressure spaces of the modulators and results in a reduction of pressure in the connected wheel brake. Into the two counterpressure spaces of this pressure modulating arrangement, controlled via electromagnetic valves, the high output pressure of a pressure accumulator can be coupled simultaneously or alternately. The pressure accumulator, via an accumulator charge pump, is constantly maintained in a charged state. The pressure-reduction control valves are controlled in a conventional by pressure-reduction control signals of an electronic control unit. These signals are provided by a processing of wheel-speed-proportional output signals of each of the wheel-speed sensors individually assigned to the vehicle wheels.

The main disadvantage in the case of the known antilock system is that the modulator pistons in a pressure-reduction control phase must be shifted against a high pressure in the respective modulator input pressure space generated with the participation of the brake-power booster unit. Thus the accumulator charge pump must be designed for a very high nominal capacity, the typical value of which is 200 w. However, a hydraulic pump, that is designed for such a high nominal capacity and output pressures around 200 bar, not only requires a relatively large overall space but is also very costly. Therefore it contributes decisively to the costs to be spent for the known antilock system. The electric wiring of a vehicle equipped with the known antilock system with the high required nominal capacity of the accumulator charge pump, must be designed for a correspondingly higher output power.

It is therefore the objective of the invention to provide an antilock system of the initially mentioned type that, while it also has a simple construction and good operational reliability, on the whole can operate with a charge pump that is designed for a clearly lower nominal capacity, for a pressure accumulator that is utilized as an auxiliary pressure source.

This and other objectives are achieved by the following:

Accordingly, a tandem master cylinder with output modulator is provided as the brake control device that has an integrated hydraulic brake-power booster unit. The brake-power boosting takes place by the admission of an auxiliary pressure that is proportional to the pedal force and is derived from the output pressure of a pressure accumulator into a booster annulus. In a pressure-reduction phase of the antilock control, this annulus is blocked off with respect to the output of the proportional control valve and at the same time pressure is removed from the annulus into the brake fluid storage tank. This admission of pressure to a counterpressure space of the modulator will shift the modulator piston only against the pedal force applied via a plunger piston of the primary piston of the tandem master cylinder, i.e., against a considerably lower actuating force than in the case of a normal actuating of the tandem master cylinder. Thus, the accumulator charge pump, compared with the known antilock system, may be designed for about half the nominal capacity resulting in a considerable reduction of manufacturing costs. The pressure accumulator can be utilized also as an auxiliary power source for the brake-power boosting resulting in a further constructional simplification.

A second pressure modulator is formed for a second brake circuit of the vehicle that can statically be acted upon by pressure and consists of a counterpiston arranged in an extension of the housing of the tandem master cylinder. The secondary pistons of the tandem master cylinder can be shifted by means of the counterpiston. Thus the further constructional simplification is achieved of the hydraulic control part comprising the brake control device and the pressure modulators, of the antilock system and of the brake system as a whole.

To achieve a finely graduated antilock control individually controlled valves are provided for the booster annulus and the counterpiston. First, the increase of the brake pressure is reduced by the cancelling of the brake-power boosting. Finally, the brake pressure is further reduced by the admission of pressure to the counterpiston of the pressure modulator. Further control is achieved by three-position electro-magnetic valves for increasing, decreasing and maintaining the control pressure of the respective pressure spaces during normal and antilock braking.

The maintaining function can be provided using a two-position valve by sequentially alternating between the increasing and decreasing control pressure positions.

In addition to the brake circuits that are statically acted upon by pressure and that, are subjected to antilock control via pressure modulators, a pressure circuit is provided that can be dynamically acted upon by pressure, i.e., by the output pressure of the proportional control valve. This third brake circuit, independently of the other two brake circuits that themselves can be controlled independently from one another, is controllable according to the drain principle. The additional costs that are required for the realizing of a third controllable brake circuit are minimal.

The output pressure of the proportional control valve can also be utilized for the admission of pressure to the counterpiston of at least one of the pressure modulators.

Other details and characteristics of the invention are found in the following description of special embodiments by means of the drawing.

DETAILED DESCRIPTION OF THE DRAWINGS

Figure 1:
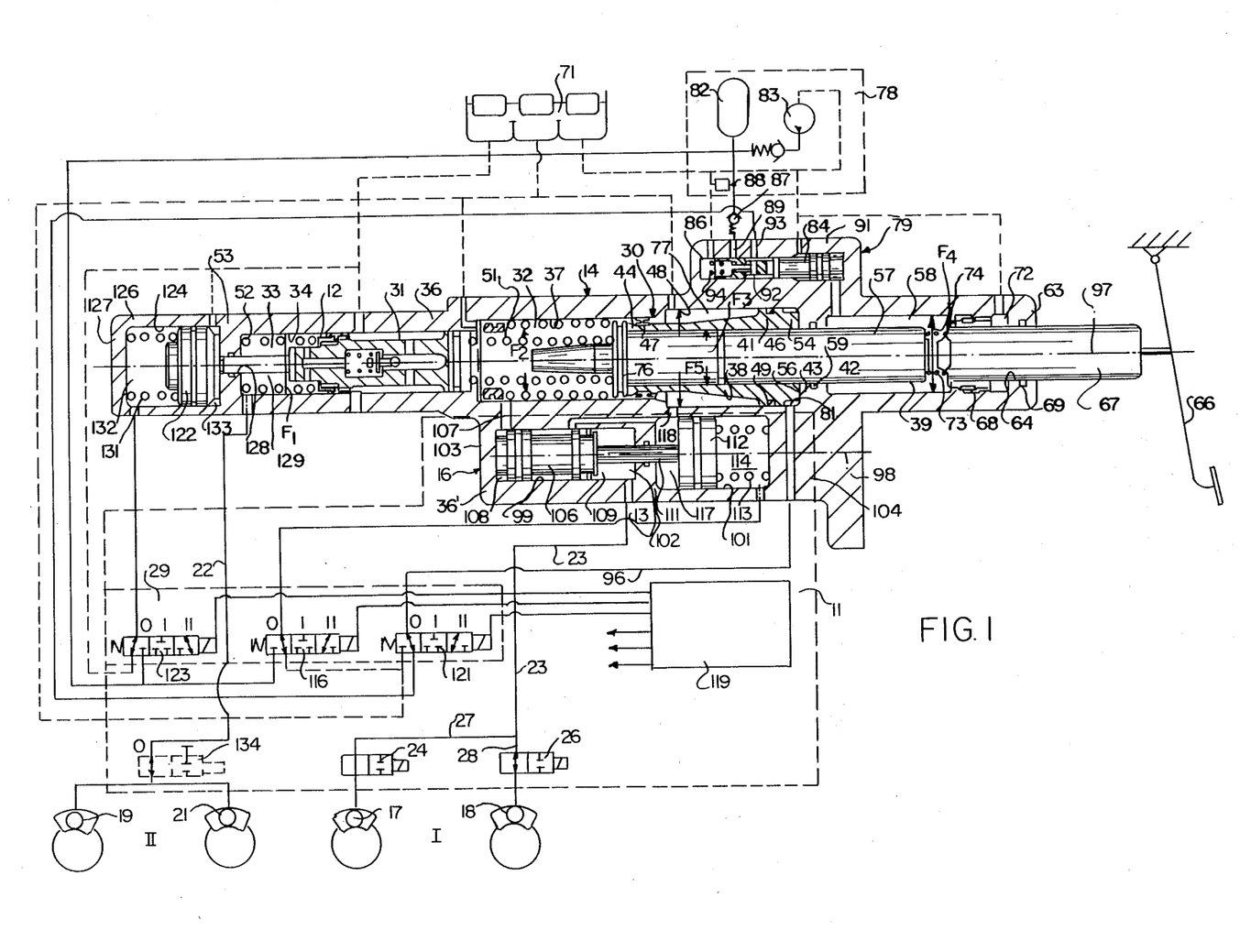
FIG. 1 is a first embodiment of an antilock system according to the invention in a dual-circuit brake system having two static brake circuits and a control valve arrangement operating with three electro-magnetic valves.

In FIG. 1, a first special embodiment 11 of an antilock system according to the invention is shown in a hydraulic dual-circuit brake system 10 of a motor vehicle with hydraulic power assistance. The antilock system 11 operates according to the known control principle of volume expansion of output pressure spaces 12 and 13 of a tandem master cylinder 14 and a pressure modulator 16 integrated into the tandem master cylinder 14. Static brake circuits I and II of the vehicle are connected respectively, to output pressure spaces 12 and 13 to operate according to this known control principle.

Without limiting generality, it is assumed that front wheel brakes 17 and 18 are combined in a front-axle brake circuit, brake circuit I, and the rear wheel brakes 19 and 21 are combined to form a rear-axle brake circuit, brake circuit II.

The antilock system 11 is developed in such way that in the two brake circuits I and II, brake pressure can be reduced and/or built up in a controlled manner in the same and/or opposite direction. When the antilock control at the rear-axle brake circuit II becomes effective, the two rear wheel brakes 19 and 21 are controlled to the same brake pressure because both rear wheel brakes 19 and 21, are connected directly to the secondary output pressure space 12 of the tandem master cylinder 14 via the master brake line 22.

When the antilock control at the front-axle brake circuit I becomes effective, the two front brakes 17 and 18 may be controlled to the same or different brake pressure because front wheel brakes 17 and 18 are connected to the output pressure space 13 of the pressure modulator 16, via the master brake line 23 with the aid of two independently controlled reversing electro-magnetic valves 24 and 26 and branch lines 27 and 28 respectively. Thus, "limited" single-wheel control is possible to the extent that at one of the two front wheel brakes 17 and 18, the brake pressure can be maintained at a previously set value, whereas at the other front wheel brake 18 and 17, the brake pressure is reduced or built up according to the control operation.

Since in the front axle brake circuit I of FIG. 1 only one pressure modulator 16 is provided, it is not possible to change the brake pressures in the two front wheel brakes 17 and 18 in the opposite direction, namely one front wheel brake pressure can be built up and the brake pressure in the other front wheel brake reduced. However, such a single-wheel control can be achieved with relatively low additional technical costs by providing one pressure modulator 16 for each front wheel brake 17 and 18, in which case the reversing valves 24 and 26 will then not be necessary.

Before describing the operation of the antilock control system 11 according to the invention and of a control valve arrangement 29, the construction and operation of tandem master cylinder 14 of the brake system 10, having an integrated hydraulic brake-power booster unit will be discussed with respect to their details that are important for the operation.

The tandem master cylinder 14 has a primary and secondary output spaces 32 and 33. The primary output pressure space 32, in axial direction, is delimited on one side by the primary piston 30 and on the other side by the floating piston 31. The primary output pressure space 32 is assigned to the front-axle brake circuit I. The secondary output pressure space 33 is delimited on one side by the floating piston 31 and is assigned to the rear axle brake circuit II.

The cylinder housing 36 of tandem master cylinder 14, as shown in detail in FIG. 1, is developed as a stepped cylinder, in which case the bore stage 34, that radially delimits the secondary output pressure space 33, has a smaller cross-sectional surface $F_1$ than the cross-sectional surface $F_2$ of the wider bore stage 37, that radially delimits the primary output stage 32.

The primary piston 30 of the tandem master cylinder 14 is developed in two parts. It comprises a ring piston 38 and an elongated cylindrical plunger piston 39 that is guided in a central bore 41 of the ring piston 38. Plunger piston 39 is also guided in a central bore 42 of an inside transverse wall 43 of the housing 36 that is in alignment with bore 41 so that piston 39 can be axially guided in a pressure sealed manner. Piston 39 has a clearly smaller cross-sectional surface $F_3$ than $F_2$ the bore stage 37 radially delimiting the primary output pressure space 32.

The ring piston 38 has two axial end flanges 44 and 46 connected with one another by a conical intermediate piece 45. By means of its one end flange 44 that is on the left according to FIG. 1, the ring piston 38 is guided in the bore stage 37 of the cylinder housing 36 that delimits the primary output pressure space 32 and is sealed off with respect to it by means of a ring lip seal 47. By means of its other end flange 46 that is one the right according to FIG. 1, the ring piston 38 is guided in a third bore stage 48 of the cylinder housing 36 and with respect to it, is also sealed off by means of a ring seal 49.

The primary piston 30 and the secondary piston 31 are supported with respect to one another as well as at the transverse wall 53 of the cylinder housing 36 in a conventional manner, by means of prestressed helical pressure springs 51 and 52. As long as the brake system is not actuated, these springs 51 and 52, force the pistons 30 and 31 into the normal position shown in FIG. 1. In this normal position, the ring piston 38, via a short projection 54, the outer diameter of which is smaller than the diameter of the third bore stage 48 of the cylinder housing 36, rests at one ring-shaped delimiting surface 56 of the partition 42. Also, the plunger piston 39, with its free end section 57, the length of which corresponds approximately to the maximal shifting path of the plunger piston 39, projects into an initial-pressure space 58. A ring seal 59, that is arranged in a ring groove of the partition bore 42 penetrated by the plunger piston 39, seals off the initial-pressure space 58 with respect to the third bore stage 48 of the cylinder housing 36. The cross-sectional surface $F_4$ of the initial-pressure space 58 is somewhat larger than that of the plunger piston 39.

A front end wall 63 of the cylinder housing 36 has a central bore 64 that is in alignment with the central bore 42 of the partition 43. A plunger piston 67, actuated by the brake pedal 66 is guided in said central bore 64 so that it can be slid in an axial direction. The plunger piston 67 is sealed off with respect to the initial-pressure space 58 by a lip collar 68 and with respect to the exterior of the cylinder housing 36 by means of a ring seal 69. An annulus 72, arranged between the lip collar 68 and the sealing ring 69, with lip collar 68 form an anti-cavitation device to provide brake fluid from the brake fluid storage tank 71 into the initial-pressure space 58 in response to for example a rapid withdrawal motion of the plunger piston 67.

The plunger piston 67, that acts as a pressure rod piston, is supported at the plunger piston 39 of the primary piston 30 by means of a prestressed helicial pressure spring 73. The plunger piston 67 is forced by spring 73 into its normal position which is marked by a stop plate 74 resting against the interior side of the front end wall 63. The normal position of the plunger piston 39 is determined by a stop flange or pulling flange 76 resting against the front side of the ring flange 44 of the ring piston 38 that is on the side of the primary pressure space 32.

The tandem master cylinder spaces 32, 33 and 58 and annulus 72 discussed so far as well as an annulus 77, delimited by the two piston flanges 44 and 46 of the ring piston 38 within the third bore stage 48, are provided with the conventional anti-cavitation flow paths via which brake fluid can flow from the storage tank 71 into the mentioned spaces and annulus.

The tandem master cylinder 14 is equipped with an integral hydraulic brake-power booster unit comprising a hydraulic auxiliary pressure source 78 and a proportional control valve 79. The proportional control valve 79 generates from the output pressure of the auxiliary pressure source 78, a control pressure proportional to the pedal force. The control presssure is coupled via control valve 121 to a driving pressure space 81, that is delimited in axial direction by the piston flange 46 of the ring piston 38, and to the ring-shaped delimiting surface 56 of the inner transverse wall 43 of the master cylinder housing 36. Upon actuating of the tandem master cylinder 14, the control pressure in driving space 81 achieves the power-assisted shifting of the primary piston 30.

The auxiliary pressure source 78 consists of a pressure accumulator 82 that can be charged from the brake fluid reservoir, by means of an accumulator charge pump 83, to a high output pressure of, for example, 160 to 180 bar. The charging operation of this accumulator charge pump 83 is controlled in the conventional way by means of a manometric switch monitoring the accumulator pressure.

In the following, the details of the proportional control valve 79 are explained by means of their operation.

When the brake pedal 66 is operated, a pressure $P_P$ is built up in the initial-pressure space 58 of the tandem master cylinder 14 and acts on a slider 84 of the proportional control valve 78. The pressure $P_P$ shifts slider 84 against the effect of a restoring spring 86 until the input duct 89 of the proportional control valve 79, that via a return valve 87 is connected to the pressure output 88 of the auxiliary pressure source 78, communicates with the control pressure output 93 via an annulus 92 delimited by the slider 84 within the valve housing 91. Thus, the output pressure of the accumulator 82 is applied to the control pressure output 93 via check valve 87, input duct 79 and annulus 92. At the same time, via a central duct of the slider 84, a counter pressure space 94 is acted upon by the accumulator pressure, causing the slider 84 to again move into the opposite direction and disconnecting the high-pressure input duct 89 and the control pressure output 93. The continuous repetition of this cycle, results in an average control pressure occurring at the control pressure output 93 proportional to the initial pressure $P_P$ generated by the actuating of the pedal 66 at a ratio indicated by the design of the proportional control valve 79.

The control output pressure $P_P$ of the proportional control valve 79 is coupled, via a control duct 96, to the ring-shaped driving pressure space 81 of the tandem master cylinder 14. In the case of a braking, the control pressure $P_S$ acts on a ring surface at the ring piston 38 which corresponds to the difference of the cross-sectional surface $F_5$ of the third bore stage 48 and of the effective cross-sectional surface $F_3$ of the plunger piston 57 of the primary piston 30. This results in a force proportional to the force of the foot which actuated the brake pedal 66.

The bores and pistons of the tandem master cylinder 14 that have been explained so far are arranged along or coaxially with respect to its central longitudinal axis 97.

The pressure modulator 16 of the antilock system 11 for the front-axle brake circuit I, in the arrangement shown in FIG. 1, is housed in a lateral housing part 36' of the tandem master cylinder 36. The central longitudinal axis 98 of this lateral housing part 36' is displaced a relatively small distance from and in parallel to the central longitudinal axis 97 of the tandem master cylinder housing 36.

The lateral housing part 36' has a first bore stage 99 and a second bore stage 101 which are separated from one another by means of a partition 102. The first bore stage 99 is arranged next to the primary output pressure space 32 of the tandem master cylinder 14 and is closed off at its end, that is on the left in FIG. 1, by means of an end front wall 103 of the lateral housing part 36'. On the opposite side, the second bore stage 101 is closed off by a right end front wall 104 of the housing part 36'. A floating modulator piston 106 is arranged in the first bore stage 99 and hydraulically separates an input space 108, which communicates with the primary output pressure space 32 of the tandem master cylinder 14 via a transverse duct 107, from an output pressure space 109 to which the main brake line 23 of the front-axle brake circuit I is connected.

The modulator piston 106 has a tappet-shaped extension 111 that project into the second bore stage 101 through a central bore of the partition 102 and is sealed off with respect to it. A counterpiston 112, being supported to shift in a pressured-sealed way within the second bore stage 101, is being forced to rest against the end of the tappet 111 of the modulator piston 106 by means of a prestressed restoring spring 113 arranged between this counterpiston 112 and the right end front wall 104. Counterpiston 112 divides second bore stage 101, on the one side, into a counterpressure space 114 and an afterflow space 117 on the other. The counter pressure space 114 is connected to the output pressure of the pressure accumulator 82 via a pressure-reduction control valve 116 of the antilock system 11. The afterflow space 117 provides anti-cavitation and is connected to the brake fluid storage tank 71 via a transverse duct 118 of the master cylinder housing 36 and the annulus 77 of the tandem master cylinder 14. Annulus 77 is delimited in axial direction by the piston flanges 44 and 46 of the ring piston 38.

The pressure-reduction control valve 116, in the case of the shown special embodiment, is a 3/3-way electromagnetic valve. The normal flowthrough position O of the valve is a first flow-through position in which pressure is removed from the counterpressure space 114 of the pressure modulator 16, by connection with the brake-fluid storage tank 71. The pressure-reduction control valve 116, can be directed into its blocked position I by means of control output signals of a defined signal level of the electronic control unit 119 of the antilock system 11, or into a flow-through position II by means of control output signals of the electronic control unit 119 that have a defined higher signal level. In the flow-through position II, counterpressure space 114 of the pressure modulator 16 is connected to the output 88 of the auxiliary pressure source 78. The electro-magnetic control unit 119 is shown only in diagram form since it is well known.

A control valve 121 is in the control duct 96 leading from the control pressure output 93 of the proportional control valve 79 to the booster driving pressure space 81 of the tandem master cylinder 14 that is acted upon by control pressure. The construction of said control valve 121, in the case of the shown embodiment, corresponding to that of the pressure reduction control valve 116. In the normal position O of control valve 121, the output pressure of the proportional control valve 79 is coupled into the driving pressure space 81 of the tandem master cylinder 14. In the blocked position I of the control valve 121, the control duct 96 is blocked with respect to the driving pressure space 81. In the flow-through position II of said control valve 121 pressure is removed from the driving pressure space 81 by connection to the brake fluid storage tank 72.

The antilock control system 11 explained so far with respect to the front-axle brake circuit I operates as follows. In a typical braking situation for which it is assumed that a locking tendency occurs at both front wheels at the same time.

In the case of an actuating of the brake system 10, the output pressure of the primary output pressure space 32 of the tandem master cylinder is coupled into its input space 108, shifting the modulator piston 106 and the counterpiston 112 of the pressure modulator 16 to the right according to FIG. 1. The front wheel brakes 17 and 18 are acted upon by a pressure being built up in the output pressure space 13 of the pressure modulator 16 that almost corresponds to the output pressure in the secondary output pressure space 32 and is slightly reduced by the effect of the restoring spring 113 of the pressure modulator 16.

When a locking tendency at one or at both the braked front wheels of the vehicle is detected by electronic control unit 119 of the antilock control system 11, from processing of wheel-speed proportional output signals of wheel speed sensors that for reasons of simplicity are not shown, the electronic control unit 119 generates a control output signal directing the control valve 121 of the control duct 96 into the blocked position I. An increasing of the brake pressure in the front-axle brake circuit I is now possible only by an increase of the pedal force.

When the locking tendency increases further, the electronic control unit 119 generates a control output signal directing the control valve 121 into its flow-through position II in which the ring-shaped operating pressure space 81 of the tandem master cylinder 14 is relieved from pressure by the connection to the brake fluid storage tank 71. As a result, the brake-power boosting is cancelled and, if the pedal-actuating force is not increased substantially, an lowering of the brake pressure in the front-axle brake circuit I results.

If, the locking tendency continues to increase, in addition to the control valve 121, the pressure-reduction control valve 116 is also directed into its blocked position I, by means of an output signal of the electronic control unit 119. This blocking of the counterpressure space 114, hydraulically "locking" the counterpiston 112 and with it also the modulator piston 106. Thus an increase of the pedal force can no longer increase of the brake pressure in the front-axle brake circuit I. If the locking tendency still continues, the electronic control unit 119 of the antilock system 11 generates an output signal directing the pressure-reduction valve 116 into its flow-through position II. The output pressure of the auxiliary pressure source 78 is coupled into the counterpressure space 114 of the pressure modulator 16 pushing the modulator piston 106, by means of the counterpiston 112, back in the direction of its shown normal position. This enlarges the volume of the modulator output pressure space 109 and thereby lowers the brake pressure in brake circuit I. By means of the pressure medium flowing back into the output pressure space 32 of the tandem master cylinder 14, the primary piston 30 is pushed back—only against the exercised pedal force—because the brake-power boosting is cancelled by the removal of pressure from the driving pressure chamber 81. When a locking tendency no longer exists, or a vehicle wheel that previously tended to lock, is accelerated again, the control output signals of the electronic control unit 119 fall off again. As soon as the pressure-reduction control valve 116 has moved back into its normal position O, brake pressure can be built up in the front-axle brake circuit I, without or with brake-power boosting depending upon the position of control valve 121.

In order to control the brake pressure in the rear-axle brake circuit II for locking tendencies in a manner that is analogous to the manner described above, a counterpiston 122 is also provided that acts on the secondary piston 31 of the tandem master cylinder, and another pressure-reduction control valve 123, connecting the output pressure of the auxiliary pressure source to 78. This other counterpiston 122 is guided to slid in a pressure-sealed manner in a bore 124 of an extension 126 of the tandem master cylinder 36. The bore 124 extends between an end front wall 127 of this lengthening 126 of the housing and the transverse wall 53 of the cylinder housing 36 limiting the primary output pressure space 33 on one side. A tappet-shaped extension 129 of the secondary piston 31 is sealed off with respect to and axially penetrates a central bore 128 into bore 124. A prestressed restoring spring 131 force the counterpiston 122 against the free end of the tappet-shaped extension 129, and in its shown normal position, against the transverse wall 53. The end front wall 127 and the counterpiston 122 delimit the counterpressure space 132 into which the output pressure of the auxiliary pressure source 78 can be coupled via the pressure-reduction control valve 123. The counterpiston 122 and the transverse wall 53 delimit an afterflow space 133 that is connected with the brake fluid storage tank 71.

The pressure-reduction control valve 123 provided for the rear-axle brake circuit II, in the case of the shown embodiment, is a 3/3-way electro-magnetic valve directed by means of control output signals of the electronic control unit 119, analogously to the pressure-reduction control valve 116 of the front-axle brake circuit I. In a normal position O, the counterpressure space 132 is connected with the brake fluid storage tank 71. In a blocked position I, the counterpiston 122 is hydraulically locked. In a flowthrough position II, the output 88 of the auxiliary pressure source 78 is connected to the counterpressure space 132. When a controlled brake pressure lowering is required in the rear-axle brake circuit II, and before the directing of the other pressure-reduction control valve 123 or at the latest at the same time of said directing into position II, the control valve 121 is also directed into its energized position II relieving pressure from the driving pressure space 81 of the tandem master cylinder 14. Thus, the pressure-lowering control motion of the counter piston 122 shifts the secondary piston 31 in the direction of its normal position expanding the volume of the secondary output pressure space 33 and transfers its withdrawal motion to the primary piston 30. This motion takes place only against the pedal force that is effective only with the pedal transmission, because the brake-power boosting is cancelled.

The "elimination" of the brake-power boosting during a pressure-reduction phase at the front axle brake circuit I results in a reduction of the brake pressure in the primary output pressure space 32 as well as in the secondary output pressure space 33 of the tandem master cylinder 14 as long as the pedal force is not increased in a compensating way. Thus a reduction of the brake effect will also occur in the rear-axle brake circuit, even when this does not require control.

In order to avoid a possibly unnecessary prolongation of the brake deceleration, the master brake line 22 of the rear-axle control circuit II can be blocked by means of a pressure-maintaining control valve 134 shown in phantom. With the start of the antilock control at the front-axle brake circuit I, control valve 134 is directed from its normal position O into the blocked position I so that the brake pressure in the wheel brakes 19 and 21 of the rear-axle brake circuit II can be maintained at the previously set instantaneous valve.

Figure 2:
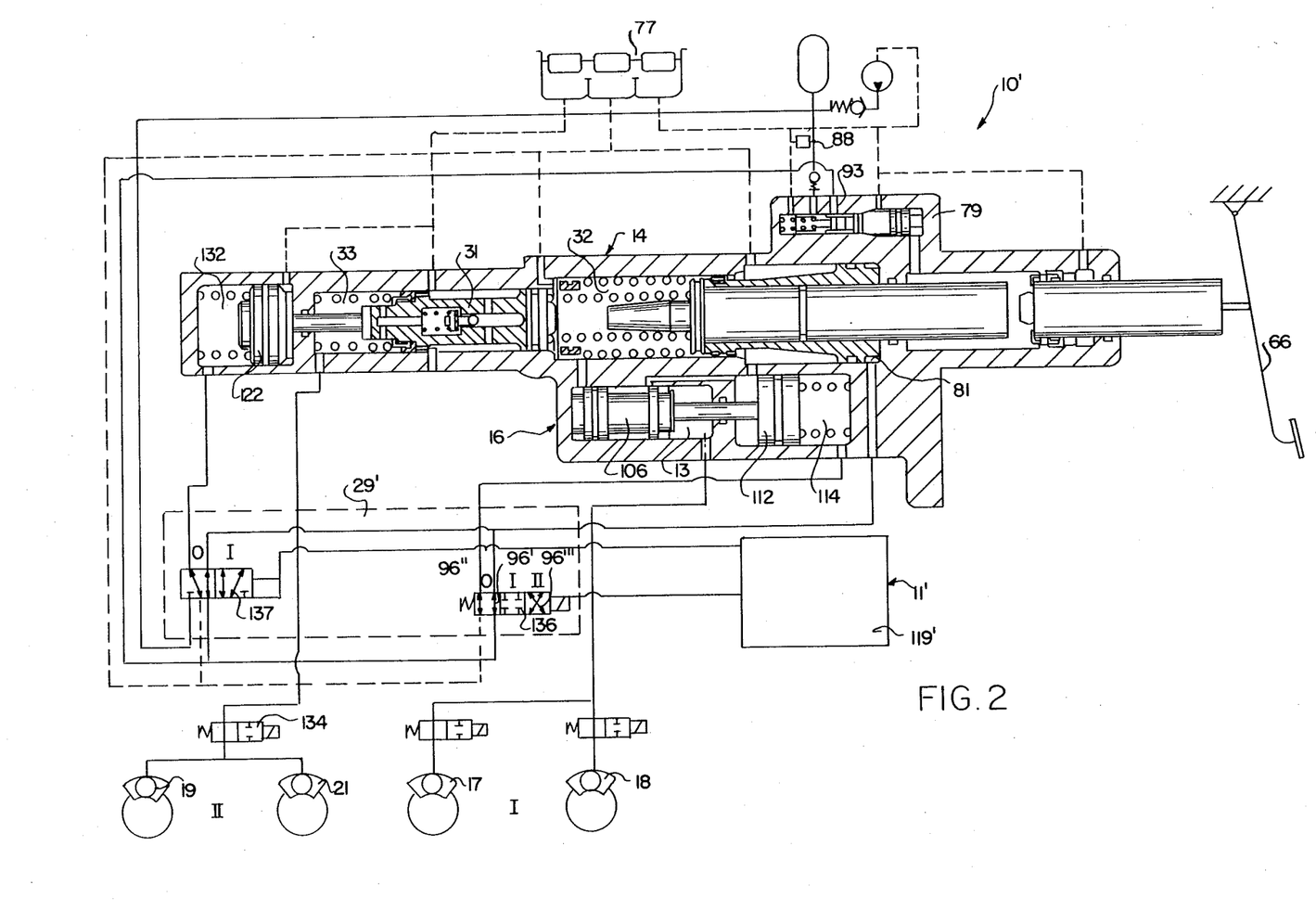
FIG. 2 is another embodiment of an antilock system according to the invention for two controllable static brake circuits which operates with the simultaneous removal of pressure from a driving pressure space and admission of pressure to a counterpressure space of pressure modulators.

The embodiment according to FIG. 2 differs from that of FIG. 1 essentially only in the construction and the resulting function of the control valve arrangement 29'. Also, the brake system 10' according to FIG. 2 has the same construction as the brake system 10 shown in FIG. 1. Therefore in FIGS. 1 and 2, the elements that are identical or analogous with respect to construction and operation have the same reference numbers. Reference is made to the description of FIG. 1 for elements having the same number.

Within the control valve arrangement 29', the front-axle brake circuit I and the rear-axle brake circuit II are each assigned only one control valve 136 and 137 that controls the relieving of pressure from the annulus 81 of the tandem master cylinder 14 as well as the admission of pressure to and the removal of pressure from the counterpressure space 114 of the pressure modulator 16. assigned to the front-axle brake circuit I, and the admission of pressure to and the removal of pressure from the counterpressure space 132, assigned to the rear-axle brake circuit II. Thus the pressure-reduction phases of the antilock control in the front-axle brake circuit I and in the rear-axle brake circuit II may take place independently from one another.

The control valve 136 assigned to the front-axle brake circuit I, in the shown special embodiment, is developed as a 4/3-way electro-magnetic valve. Its normal position 0 is a flow through position in which the output pressure of the proportional control valve 79, that is proportional to the pedal force, can be coupled into the ring-shaped driving pressure space 81 of the tandem master cylinder 14, via a passage duct 96' of the control valve 136, and the counterpressure space 114 of the pressure modulator 16 is relieved of pressure into the brake fluid storage tank 71.

By means of a pressure-maintaining output signal of the electronic control unit 119' of the antilock system 11', the control valve 136 of the front-axle brake circuit I can be directed into a blocked position I in which the driving pressure space 81 of the tandem master cylinder 14 and the counterpressure space 114 of the pressure modulator 16 are blocked. In the blocked position I of the control valve 136, in the front-axle brakes 17 and 18, the brake pressure is set to what it was immediately before the transition of the control valve 136 into its blocked position. A pressure-reduction control signal of the electronic control unit 119', that has a defined higher signal level than the pressure-maintaining control signal, directs the control valve 136 into a flow-through position II. In this position, the driving pressure space 81 of the tandem master cylinder 14 is relieved of pressure into the brake fluid storage tank 71 and the counterpressure space 114 is connected with the output 93 of the proportional control valve 79 via a flow-through path 96' of the control valve 136.

In the embodiment according to FIG. 2, in contrast to the embodiment according to FIG. 1, the counterpressure space 114 of the pressure modulator 16 is acted upon by the output pressure of the proportional control valve 79 that is proportional to the pedal force in a pressure-reduction control phase of the antilock system 11'. So that the output pressure of the proportional control valve 79 admitted to the counterpiston 112 of the pressure modulator 16 is sufficient to shift the modulator piston 106 in the sense of a braking pressure reduction in the front-axle brake circuit I, the cross-sectional surface of the counterpiston must, as shown, be significantly larger than the effective cross-sectional surface of the modulator piston 106. The modulator piston 106 as a floating piston, transmits the pressure existing in the primary output space 32 of the tandem master cylinder maximally, at a ratio of 1/1, into the front-axle brake circuit I.

The control valve 137 of the control valve arrangement 29' assigned to the rear-axle brake circuit, in the case of the shown special embodiment, is developed as a 5/2-way electro-magnetic valve. It is triggered by a pressure-reduction control signal of the electronic control unit 119' to change from its shown normal position 0 into its energized position I. Upon removal of this pressure-reduction control signal, it falls back into its normal position O. In the normal position O of control valve 137 during a normal braking, the counterpressure space 132 of the tandem master cylinder assigned to the rear-axle brake circuit II is relieved of pressure into the brake fluid storage tank 71. And the ring-shaped driving pressure space 81 of the tandem master cylinder 14 is in connected with the output 93 of the proportional control valve 79. In this normal position O of the control valve 187 brake pressure can be built up in it with or when the antilock control is effective at the front axle without power assistance.

In the alternative flow-through position I of the control valve 137, the ring-shaped driving pressure space 81 of the tandem master cylinder 14 is relieved of pressure into the brake fluid storage tank 71 and the counterpressure space 132 of the tandem master cylinder 14, assigned to the rear-axle brake circuit II, is connected to the high-pressure output 88 of the auxiliary pressure source 78. In this energized position I of the control valve 137 of the rear-axle brake circuit II, the secondary piston 31 of the tandem master cylinder is pushed back by the counterpiston 122 in the direction of its normal position. Because of the resulting volume expansion of the secondary output pressure space 33 of the tandem master cylinder 14, a reduction of pressure is achieved in the rear axle brake circuit II.

The control valves 136 and 137 of the control valve arrangement 29' of FIG. 2, in contrast to the embodiment according to FIG. 1, only require two electromagnetic valves to independently control, brake-pressure reduction phases of the antilock system 11' at the two brake circuits I and II.

Another simplification of the construction of the control valve arrangement 29' can be made possible by making control valve 136 a two-position valve without a blocking position like the control valve 137 assigned to the rear-axle brake circuit II, and achieving the function of the blocked position by a pulse-controlled, periodic reversing between the alternative flow-through positions.

Figure 3:
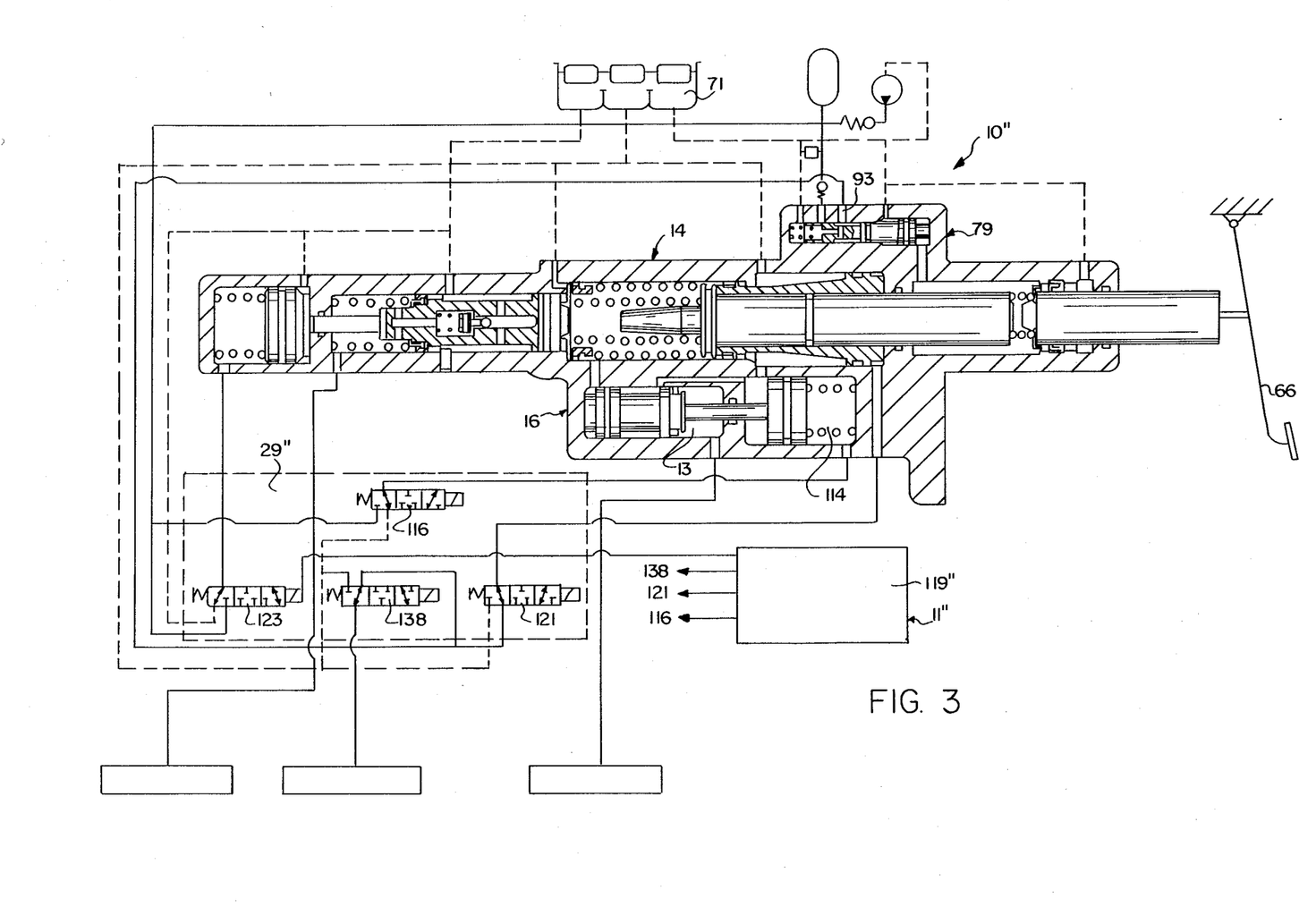
FIG. 3 is another embodiment of an antilock system according to the invention having two static brake circuits that can be controlled according to the principle of volume expansion of an output pressure space and one dynamic brake circuit that can be controlled according to the drain principle.

The additional embodiment of a brake system 10" equipped with an antilock system 11" shown in FIG. 3, differs from that according to FIG. 1 only in that a third brake circuit III is provided that can be subjected to an antilock control independently from the other two brake circuits I and II. Also the two brake circuits I and II can be controlled independently from one another.

While the two brake circuits I and II, as in the case of the embodiment according to FIG. 1, are brake circuits that can be statically acted upon by the output pressure of the pressure modulator 16 or the output pressure generated in the secondary pressure space 33 of the tandem master cylinder 14, the third brake circuit III is a dynamic brake circuit acted upon by the output pressure of the proportional control valve 79.

Apart from the selection of the vehicle wheels that can be braked in the individual brake circuits I, II and III, the development and the type of the brake pressure control in the two static brake circuits I and II in the brake system 10" according to FIG. 3 is identical to the brake system 10 according to FIG. 1. Therefore, the identical reference numbers are used in FIG. 3 as in FIG. 1 so that, with respect to the constructional and functional elements that have the same reference numbers in the figures, reference can be made to the description concerning FIG. 1.

Compared with the control valve arrangement 29 according to FIG. 1, the control valve arrangement 29" according to FIG. 3 comprises only an additional control valve 138 for brake circuit III. By appropriate control triggering, the brake pressure of the brake circuit III can be increased into can be maintained at a previously set value and can also be reduced. This additional control valve 138 is a 3/3-way electro-magnetic valve. In the normal position O, the output pressure at the output 93 of the proportional control valve 79, that is proportional to the pedal force delivered, can be coupled into the brake circuit III. This control valve 138, by means of an output signal of the electronic control unit 119", can be directed into a blocked position I in which the brake reassure in the brake circuit III is maintained at the previously set instantaneous value. By means of another control output signal of the electronic control unit 119" higher than the pressure maintaining control signal, the control valve 138 of the brake circuit III is directed into a flow-through position II in which the brake circuit III is drained or relieved of pressure into the brake fluid storage tank 71.

A brake circuit division for a road vehicle that is advantageous for the brake system 10", according to FIG. 3, consists of the brake circuits I and II, that can be statically acted upon by pressure, being assigned to each of the two front wheels of the vehicle and the rear wheel brakes of the vehicle being combined in brake circuit III, that can be dynamically acted upon by pressure.

The valve arrangement 29" according to FIG. 3, can be modified analogously to the embodiment according to FIG. 2, using only one control valve via which, in pressure-reduction phases of the antilock control, the output pressure of the proportional control valve 79 can be coupled into the counterpressure space 114 of the pressure modulator 16 instead of the two control valves 116. Also, instead of three position valves, only two-position valves are use in which, a pressure-maintaining function is achieved by pulse-controlled periodic reversing between alternative flow-through positions, instead of a blocked position, as explained for the control valve 137 of FIG. 2.

Finally, it should also be pointed out that an additional brake circuit that can be controlled independently of brake circuits I and II and can be statically acted upon by pressure can also be achieved by providing an additional pressure modulator, corresponding to the pressure modulator 16 and integrated into the tandem master cylinder 14, and an additional valve of the control valve arrangement corresponding, for example, to the control valve 116.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An antilock system for a vehicle having a power assisted hydraulic brake system comprising:
   a control cylinder means having a primary piston separating a primary output pressure space from a boosting space, and means for applying pedal force to said piston;
   a pressure modulator means having a floating piston separating a modulator input space, which is connected to said primary output pressure space, from a modulator output space which is connected to a first brake circuit, and a counter piston delimiting a counter pressure space on one side and engaging said floating piston;
   an auxiliary pressure source;
   a proportional control means for providing an auxiliary proportional pressure which is proportion to said pedal force; and
   a control valve means connected to said boosting space, said counter pressure space, said auxiliary pressure source, and said proportional control means for connecting said auxiliary proportional pressure to said boosting space in a normal braking position and connecting said auxiliary pressure source to said counterspace in an antilocking position.

2. An antilock system as described in claim 1 wherein said control valve means relieves pressure from said counterspace in said normal braking position and relieves pressure from said boosting space in said antilocking position.

3. An antilock system as described in claim 1 wherein said primary piston includes an outer ring piston and a plunger piston that can be slid in a central bore of the ring piston, said pedal force being applied to said plunger piston, said ring piston delimiting said boosting space on one side, and said plunger piston having a pulling flange engaging said ring piston at a front wall facing said primary output pressure space.

4. An antilock system as described in claim 1 wherein said control cylinder includes a secondary piston separating a second output pressure space, which is connected to a second brake circuit, from said primary output pressure space, and includes a second counter piston delimiting on one side a second counter pressure space and engaging said secondary piston, and
   including a second control valve means connected to said second counter pressure space and said auxiliary pressure source for connecting said auxiliary pressure source to said second counter pressure space in an antilock position and relieving pressure from said second counter pressure space in a normal braking position.

5. An antilock system as described in claim 4 wherein both of said control valve means include a maintaining position for blocking pressure flow to and from their respective pressure spaces.

6. An antilock system as described in claim 1 wherein said control valve means includes:
   first valve means connected to said auxiliary pressure source and said counter pressure space for relieving the pressure from said counterspace in a normal brake condition and connecting said auxiliary pressure source to said counterspace in an antilocking position; and
   second valve means connected to said proportional control means and said boosting space for connecting said auxiliary proportional pressure to said boosting space in a normal brake position and relieving pressure from said boosting space in an antilocking position.

7. An antilock system as described in claim 1 wherein said auxiliary pressure source is said proportional control means.

8. An antilock system as described in claim 1 wherein said auxiliary pressure source is a source of high pressure and said proportional control means is connected to and generates said auxiliary proportional pressure from said auxiliary pressure source.

9. An antilock system as described in claim 1 wherein said first and second valve means each include a maintaining position for blocking pressure flow to and from said boosting space and counterpiston space respectively.

10. An antilock system as described in claim 1 wherein said control valve means includes a maintaining position for blocking pressure flow to and from said boosting space and said counter pressure space.

11. An antilock system as described in claim 1 including control means sequentially directing said control valve means to said normal braking position and said antilock position to maintain pressure in said boosting and counterspaces.

12. An antilock system as described in claim 1 including a second control valve means connected to said proportional control means and a second brake circuit for connecting said auxiliary proportional pressure to said second brake circuit in a normal brake position and relieving pressure from said second brake circuit in a antilock position.

13. An antilock system as described in claim 12 wherein said second control valve means includes a maintaining position for blocking pressure flow to and from said second brake circuit.

14. An antilock system as described in claim 1 wherein said auxiliary pressure source is said proportional control means.

15. An antilock system as described in claim 1 wherein said auxiliary pressure source is a source of high pressure and said proportional control mean is connected to and generates said auxiliary proportional pressure from said auxiliary pressure source.

16. An antilock system as described in claim 1 wherein said control means reduces brake pressure in said first brake circuit in said antilocking position by moving said floating piston via said counter piston to enlarge said modulator output space.

17. An antilock system for a vehicle having a power assisted hydraulic brake system comprising:
   a control cylinder means having a primary piston delimiting a primary output pressure space on one side;
   pedal means for applying a pedal force to said primary piston;
   proportional control means for applying a booster force to said primary piston proportionally greater than said pedal force;

modulator means having a floating piston separating a modulator input pressure space, which is connected to said primary output pressure space, from a modulator output pressure space, which is connected to a first brake circuit;

counter means for moving said floating piston in a direction to enlarge said modulator output pressure space; and antilock control means for activating said proportional control means and deactivating said counter means to provide boosting to increase pressure in said brake circuit during normal braking and for activating said countermeans and deactivating said proportional control means to disable boosting and low pressure in said brake circuit during antilock braking.

18. An antilock system as described in claim 17 including a high pressure source and wherein said proportional control means and said counter means are fluid devices and said antilock control means includes valve means for controlling the interconnection of said high pressure source to said proportional control means and said counter means during normal and antilock braking.

* * * * *